(12) United States Patent
Hutzler et al.

(10) Patent No.: US 9,117,354 B2
(45) Date of Patent: Aug. 25, 2015

(54) SYSTEM AND METHOD FOR PROTECTING AGAINST TAMPERING WITH A SECURITY DEVICE

(75) Inventors: Richard Hutzler, Ocean Shores, WA (US); William M. Smith, Jr., Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 13/041,187

(22) Filed: Mar. 4, 2011

(65) Prior Publication Data

US 2012/0223837 A1    Sep. 6, 2012

(51) Int. Cl.
    *G08B 21/00*     (2006.01)
    *G08B 13/14*     (2006.01)
    *G06F 21/86*     (2013.01)
    *G06F 21/88*     (2013.01)
    *G08B 21/02*     (2006.01)

(52) U.S. Cl.
    CPC ............ *G08B 13/1445* (2013.01); *G06F 21/86* (2013.01); *G06F 21/88* (2013.01); *G08B 13/1427* (2013.01); *G08B 21/0213* (2013.01)

(58) Field of Classification Search
    CPC ..... G06F 21/86; G06F 21/88; G08B 13/1445; G08B 21/0213
    USPC ............. 340/5.31, 5.74, 568.1, 568.2; 726/35
    See application file for complete search history.

(56) References Cited

U.S. PATENT DOCUMENTS

| | | | |
|---|---|---|---|
| 5,675,321 A | 10/1997 | McBride | |
| 6,199,163 B1 | 3/2001 | Dumas et al. | |
| 6,216,230 B1 | 4/2001 | Rallis et al. | |
| 6,297,735 B1 | 10/2001 | Abel | |
| 6,389,853 B1 | 5/2002 | Pate et al. | |
| 6,459,374 B1 | 10/2002 | Rand et al. | |
| 6,756,704 B2 | 6/2004 | Milojicic et al. | |
| 7,024,698 B2 | 4/2006 | Tanaka et al. | |
| 7,362,227 B2 | 4/2008 | Kim | |
| 7,515,048 B1 | 4/2009 | Bhattiprolu et al. | |
| 7,543,467 B2 | 6/2009 | Sheehan | |
| 7,696,857 B2 | 4/2010 | Kritt et al. | |
| 7,701,339 B2 | 4/2010 | Irmscher et al. | |
| 8,181,028 B1 | 5/2012 | Hernacki et al. | |
| 2002/0113704 A1 | 8/2002 | Hess | |
| 2002/0175818 A1* | 11/2002 | King et al. | 340/572.8 |
| 2003/0065934 A1* | 4/2003 | Angelo et al. | 713/200 |
| 2006/0123242 A1 | 6/2006 | Merrem | |
| 2006/0250240 A1* | 11/2006 | Merrem et al. | 340/568.2 |
| 2008/0001705 A1* | 1/2008 | Kritt et al. | 340/5.31 |

(Continued)

OTHER PUBLICATIONS

Intel Corporation (2010). Protect Laptops and Data with Intel@ Anti-Theft Technology. Intel.com. [recieved information on Jun. 24, 2010].

*Primary Examiner* — Mark Rushing
(74) *Attorney, Agent, or Firm* — Kunzler Law Group (57) ABSTRACT

A lock for securing an electronic device includes a tamper module and a destruction module. The tamper module determines whether a component of the lock has been compromised. The tamper module may determine whether a cable securing the electronic device has been cut. If the tamper module determines that a lock component has been compromised, a destruction module may destroy an enabling component that enables the electronic device to operate. The destruction module may destroy a transmitter in the lock that communicates an authentication code if the electronic device will not function without the authentication code.

20 Claims, 5 Drawing Sheets

(56) References Cited

U.S. PATENT DOCUMENTS

| | | |
|---|---|---|
| 2008/0028477 A1 | 1/2008 | Lehmann et al. |
| 2008/0110217 A1 | 5/2008 | Andrews et al. |
| 2008/0120716 A1 | 5/2008 | Hall et al. |
| 2008/0140967 A1 | 6/2008 | Breslau et al. |
| 2008/0178304 A1 | 7/2008 | Jeansonne et al. |
| 2008/0295184 A1 | 11/2008 | Su |
| 2009/0189765 A1 | 7/2009 | Lev et al. |
| 2009/0267766 A1 | 10/2009 | Pasma |
| 2010/0014676 A1 | 1/2010 | McCarthy et al. |
| 2010/0071077 A1 | 3/2010 | Morris et al. |
| 2010/0147041 A1 | 6/2010 | Teicher et al. |
| 2012/0176243 A1* | 7/2012 | Andersen .................. 340/568.1 |
| 2012/0226910 A1 | 9/2012 | Hutzler et al. |

* cited by examiner

SYSTEM AND METHOD FOR PROTECTING AGAINST TAMPERING WITH A SECURITY DEVICE

BACKGROUND

1. Field

The subject matter disclosed herein relates to security devices for electronic devices and to preventing tampering with security devices.

2. Description of the Related Art

Electronics are becoming increasingly light, portable, and widespread among consumers. Many users favor laptop computers for their portability. Cellular phones are being designed to perform increasingly complex tasks. Electronic book readers, tablets, and other electronic devices are becoming increasingly prevalent. These electronic devices often represent a substantial investment by the owner. In addition, these electronic devices often contain sensitive personal information, such as credit card numbers, social security numbers, addresses, and other information, within them.

Even if an electronic device is locked, there is still a risk that a thief may break the lock and steal the electronic device. Sounding an alarm if the lock is broken may not stop the thief; in a public place, people may be unwilling to confront the thief even if they know that he is stealing the electronic device. Other approaches may inadequately protect data from theft.

BRIEF SUMMARY

An approach to securing an electronic device is disclosed. The invention may be realized as an apparatus that includes a tamper module that monitors lock components of a lock that secures an electronic device. The tamper module may also determine whether any lock component has been compromised. The apparatus may also include a destruction module that destroys an enabling component if the tamper module determines that one of the lock components is compromised. An enabling component is a component that enables the electronic device to operate.

Certain lock components may also be enabling components, which are referred to as enabling lock components. The destruction module may destroy one or more enabling lock components if the tamper module determines that a lock component is compromised. A device security module may include a cable and share an authentication code with a data security module. The device security module may be an enabling lock component. The data security module may prevent the electronic device from operating if the device security module is not coupled to the electronic device, or if the authentication code is either incorrect or not provided. The data security module may also be an enabling lock component. The destruction module may destroy one of these components. The destruction module may destroy the device security module by destroying an authentication code module of the device security module.

The tamper module may monitor a cable and determine that the cable is compromised if the cable is severed. The tamper module may monitor the cable by monitoring the electrical resistance of the cable. The tamper module may also monitor the casing for the device security module and determine that the device security module is compromised if the casing is opened.

The invention may be realized as a system that includes the device security module, data security module, tamper module, and destruction module referenced above. The invention may also be realized as a method that includes monitoring lock components of the lock securing the electronic device, determining whether a lock component has been compromised, and destroying an enabling component if the lock component is compromised.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
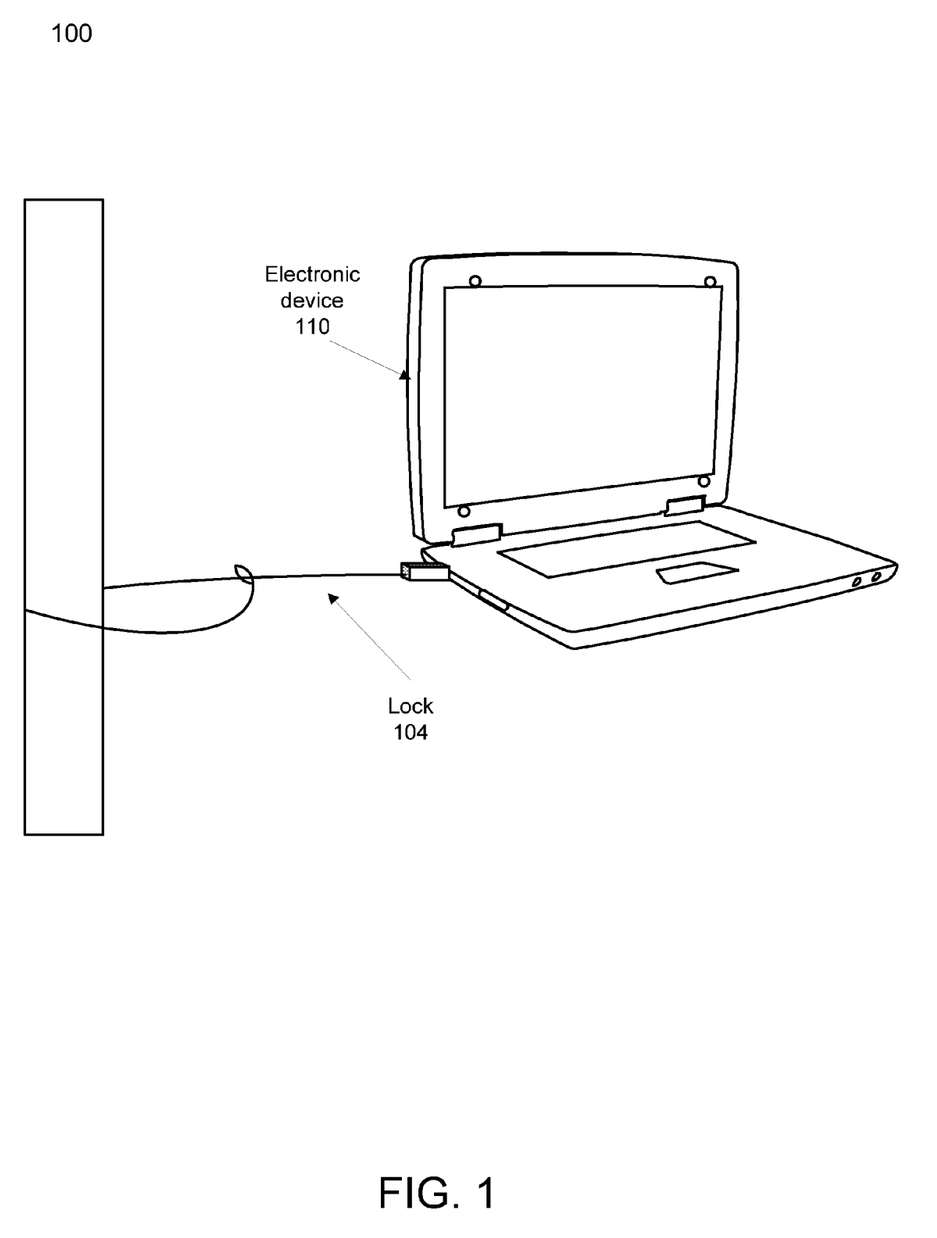
FIG. 1 is an illustration of one embodiment of a system including an electronic device and a lock.

FIG. 1 depicts one embodiment of a system 100 for securing an electronic device 110. An electronic device 110 is any device that can store data and perform operations for a user. The electronic device 110 may be a laptop computer, a cellular phone, a desktop computer (such as a tower), a personal digital assistant (PDA), a digital book reader, or other electronic device.

The electronic device 110 also includes enabling components. An enabling component, as used herein, refers to a physical component that enables the electronic device 110 to operate. Those enabling components that are situated within the electronic device 110 may be referred to as enabling device components. Examples of enabling device components include, but are not limited to, basic input output system (BIOS) circuits, uniform extensible firmware interface (UEFI) circuits, hard drives, bus controllers, computer processing units (CPUs), and other components of an electronic device 110 without which the electronic device 110 will not operate.

FIG. 1 also shows a lock 104 that is being used to secure the electronic device 110. The lock 104 includes one or more lock components. For example, one lock component may be a cable that can be attached to permanent or heavy objects in the surrounding environment (like a pillar or pole). Another lock component may be a locking lug that can be used secure the lock 104 to the electronic device 104. Certain lock components of the lock 104 may be situated within the electronic device 110. For example, the lock 104 may include a locking lug receptacle that is situated within the electronic device 110 and that connects to the locking lug. The lock 104 couples to the electronic device 110 and can put in a locked position, thus securing the electronic device 110. One embodiment of a lock 104 is shown and discussed in greater detail in connection with FIG. 3.

In certain embodiments, the lock 104 includes one or more lock components that are enabling components. As used herein, an enabling lock component is a lock component that enables the electronic device 110 to operate. As used herein, the term "operate" means that the electronic device 110 operates normally and provides access to data stored on the storage device of the electronic device 110. A component is thus a necessary component if, without that component, the electronic device 110 will not operate normally. The electronic device 110 may not, for example, boot without an enabling component.

The lock 104 may be configured to monitor lock components and to determine whether or not any of the lock components have been compromised. As used herein, a lock component is compromised if the lock component is, is suspected of being, or is in danger of being, bypassed.

Figure 2:
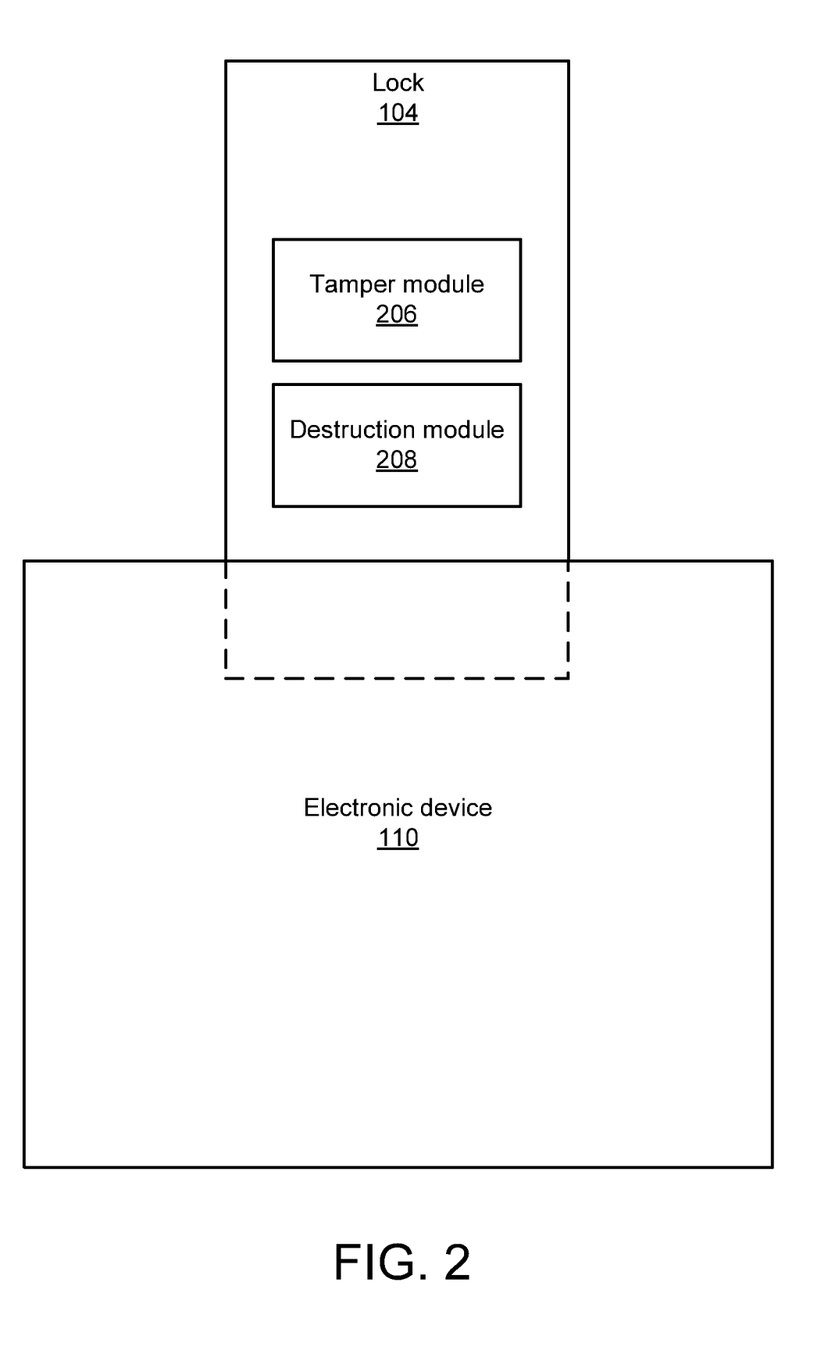
FIG. 2 is an illustration of one embodiment of a schematic block diagram of a lock coupled to an electronic device.

FIG. 2 shows a schematic block diagram showing one possible configuration of a lock 104. The lock 104 may have one or more lock components within the electronic device 110 that allow the lock 104 to secure the electronic device 110. In one embodiment, the lock 104 includes a tamper module 206 and a destruction module 208. The tamper module 206 monitors one or more lock components of the lock 104 and determines whether any lock component is compromised. The destruction module 208 destroys an enabling component in response to the tamper module 206 determining that a lock component is compromised.

In certain embodiments, the destruction module 208 destroys one or more of the enabling lock components if the tamper module determines that one of the lock components has been compromised.

Figure 3:
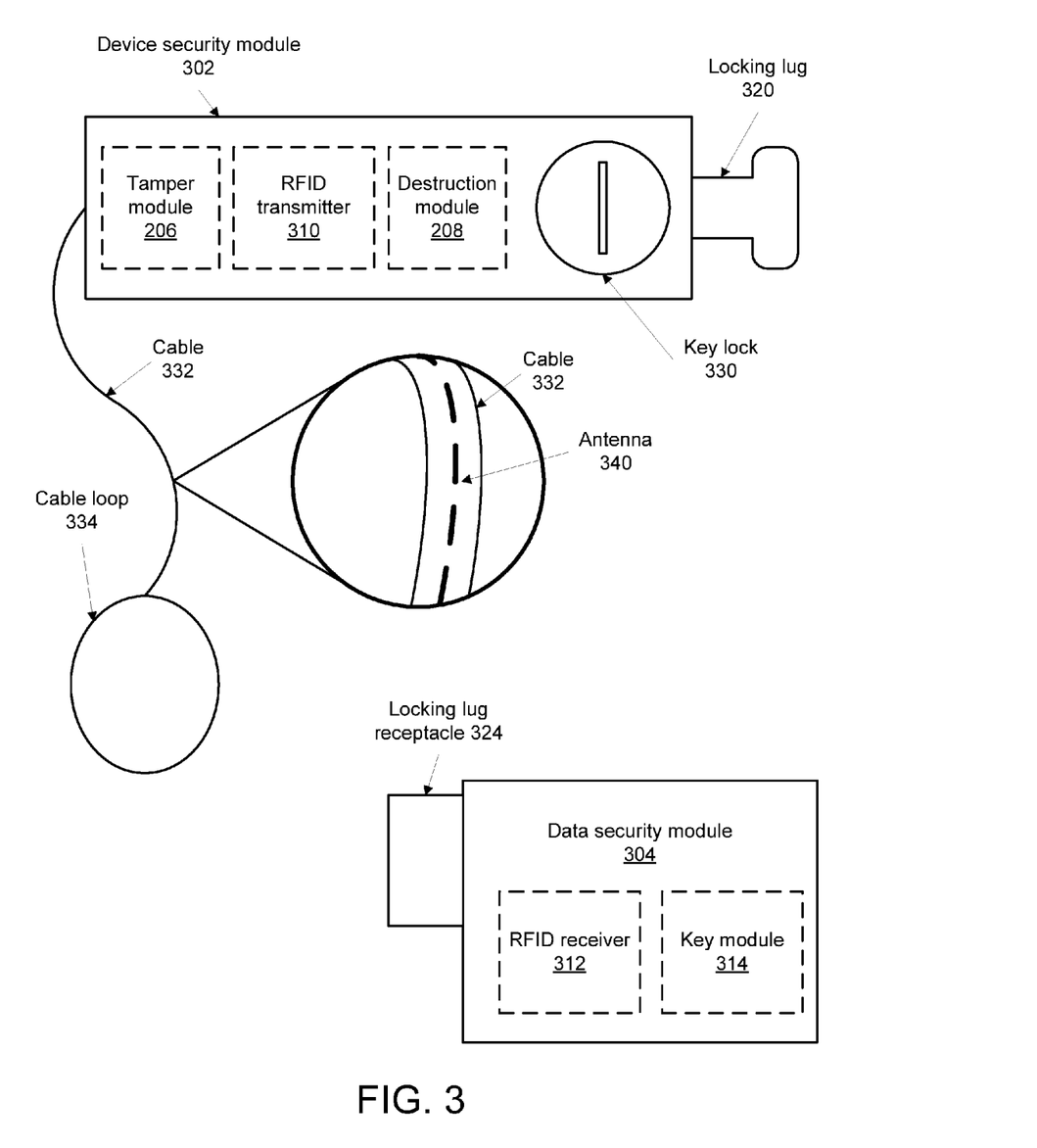
FIG. 3 is a schematic block diagram showing one embodiment of a lock.

FIG. 3 shows one embodiment of a lock 104 that includes a device security module 302 and a data security module 304. In certain embodiments, the device security module 302 and the data security module 304 are enabling lock components.

In certain embodiments, the data security module 104 is designed to fit within the outer shell of an electronic device 110. The device security module 302 may be coupled to the electronic device 110 by connecting to the data security module 304. For example, the data security module 304 may fit within the outer shell of a laptop computer. The outer shell of the electronic device 110 may provide an aperture that exposes the locking lug receptacle 324. The user may wrap the cable 332 around a feature, pass the body of the device security module 302 through the cable loop 334, and insert the locking lug 320 into the locking lug receptacle 324. When the user locks the device security module 302, the electronic device 110 may be coupled to the device security module 302 and the electronic device 110 secured to the particular physical location. Other configurations of a device security module 302 can also be used to secure the electronic device 110 to a particular physical location. The present invention is not limited to the configuration shown in FIG. 3.

FIG. 3 shows the tamper module 206 and the destruction module 208 implemented on the device security module 302. In certain embodiments, the tamper module 206 and the destruction module 208 may be implemented on the data security module 304. The tamper module 206 and the destruction module 208 may also have components on both the device security module 302 and the data security module 304 such that tampering with either can be detected, and such that enabling lock components on either can be destroyed.

The device security module 302 may also include an authentication code module that shares an authentication code with the data security module 304. The authentication code module may be realized, in one embodiment, as the radio frequency identification (RFID) transmitter 310. The data security module 304 may be equipped with an RFID receiver 312 that communicates with the RFID transmitter 310. In certain embodiments, the data security module 304 prevents the electronic device 110 from operating if the device security module 302 is uncoupled from the electronic device 110 or if the authentication code is either incorrect, or has not been provided.

In certain embodiments, the data security module 304 polls the device security module 302 at intervals for the authentication code. The tamper module 206 may determine that the device security module 302 has been compromised if the data security module 304 does not provide the correct authentication code within an acceptable time period. The device security module 302 may also push the authentication code. The tamper module 206 may determine that the data security module 304 is compromised if the data security module 304 does not acknowledge receiving the authentication code.

In certain embodiments, the electronic device 110 only works if the device security module 302 is coupled to the electronic device 110 via the data security module 304. In such embodiments, the device security module 302 and the data security module 304 may perform the authentication check using the authentication code at startup of the electronic device 110. In embodiments where the electronic device 110 will be powered down if the device security module 302 is uncoupled (whether removed or unlocked), it may not be necessary to poll or push the authentication code during operation of the electronic device 110 as the device security module 302 cannot be swapped out without powering down the electronic device 110.

While FIG. 3 depicts the RFID transmitter 310 as being in the device security module 302, and the RFID receiver 312 as being in the data security module 304, the RFID transmitter 310 may be situated in the data security module 304 and the RFID receiver 312 situated in the device security module 302. Similarly, the authentication code module may be realized using a variety of different technologies. The authentication code module may use Bluetooth or another wireless communication technology. In certain embodiments, the authentication code module uses a wired connection to communicate the authentication code. For example, the device security module 302 and the data security module 304 may make a wired connection when the locking lug 320 is inserted into the locking lug receptacle 324. This wired connection may allow the authentication code to be communicated between the device security module 302 and the data security module 304 using electrical impulses, light, or other approaches for transmitting data. The authentication code module may use the wired connection to transmit the authentication code to the data security module 304.

In one embodiment, the destruction module 208 destroys either the device security module 302 or the data security module 304. As used in this application, "destroy" means physically ruining one or more pieces of hardware such that the device containing the hardware is nonfunctional without replacing or repairing the ruined pieces of hardware. In one embodiment, the destruction module 208 destroys the device security module 302 by destroying the authentication code module that shares the authentication code with the data security module 304. The destruction module 208 may contain, for example, a surge circuit that is activated if the tamper module 206 determines that a lock component is compromised. The surge circuit may cause too much power to flow to the RFID transmitter 310, thereby destroying the RFID transmitter 310. Since the RFID transmitter 310 is destroyed, the data security module 304 cannot receive the authentication code and the electronic device 110 will not operate.

In other embodiments, the destruction module 208 is located in the data security module 304 and destroys the RFID receiver 312. The destruction module 208 may destroy the memory that stores the authentication code, causing the authentication code to be lost. The destruction module 208 may destroy one or more sensors that enable the data security module 304 to detect that the device security module 302 is attached. The destruction module 208 may destroy enabling device components such as the BIOS, bus controllers, the motherboard, memory, the storage medium, or the like in the electronic device 110. Other approaches to destroying enabling components may also be used. The destruction module 208 may also destroy more than one enabling component if the tamper module 206 determines that a lock component has been compromised.

The tamper module 206 may monitor the physical status of lock components to determine whether any of the lock components are compromised. The tamper module 206 may monitor the cable 332 to determine whether or not the cable has been severed. In one embodiment, the cable 332 includes an antenna 340. The antenna 340 may be the antenna used by the RFID transmitter 310. In such embodiments, the tamper module 206 may monitor the resistance of the antenna 340. The tamper module 206 may determine that the cable 332 has been cut (and thus compromised) by detecting the change in the resistance of the antenna 340.

The tamper module 206 may also monitor the physical status of other lock components in addition to the cable 332. The tamper module 206 may monitor the integrity of the device security module 302. In one embodiment, the tamper module 206 may monitor the integrity of the casing for the device security module 302, allowing the tamper module 206 to determine whether the casing for the device security module 302 has been opened and thus compromised. In one embodiment, this detection is done by filling the interior of the device security module 302 with a gas such as nitrogen or carbon dioxide and sealing the casing. The tamper module 302 may contain an oxygen sensor. In the event that the casing of the tamper module 302 is opened, the oxygen sensor may detect the presence of oxygen and determine that the device security module 302 has been compromised. Other approaches by which the tamper module 302 may monitor lock components and determine whether lock components have been compromised may also be used. The tamper module 206 may also have one or more components in the data security module 304 that determine whether the data security module 304 has been compromised.

In certain embodiments, the data security module 304 also includes a key module 314. The key module 314 may also be implemented on the device security module 302, or elsewhere in the system. In certain embodiments, the tamper module 206 determining whether a lock component is compromised involves invoking the key module 314. The key module 314 prompts the user for a user key. If the user enters a correct user key, the tamper module 206 may determine that the lock component has not been compromised. If the user enters an incorrect user key, the tamper module 206 may determine that the lock component has been compromised. The tamper module 206 may invoke the key module 314 if the tamper module 206 determines that the physical status of a lock component indicates that it is compromised.

The key module 314 may open a dialogue box or a special screen on the display of the electronic device 110 to prompt the user for the user key. The key module 314 may provide the user a limited number of attempts to enter the correct user key. If the user exceeds the permissible number of attempts, the key module 314 may report to the tamper module 206 that the user has failed to enter the correct user key, and the tamper module 206 may conclude that the lock component has been compromised.

They user key is a data value. The user key may be an alpha-numeric code entered by the user on a keyboard for the electronic device 110. The user key may also function as an encryption key that encrypts and decrypts data stored on the electronic device 110.

Requesting a user key before concluding that a lock component has been compromised may provide protection from false positives. For example, a user may forget to unlock the electronic device 110 before starting to walk away with it. The yank on the cable 332 may be strong enough to register as an attempt to tamper with the cable 332. By prompting the user to input the user key before concluding that the cable 332 has, in fact, been tampered with, a measure of confidence is provided before the destruction module 208 destroys enabling components.

Figure 4:
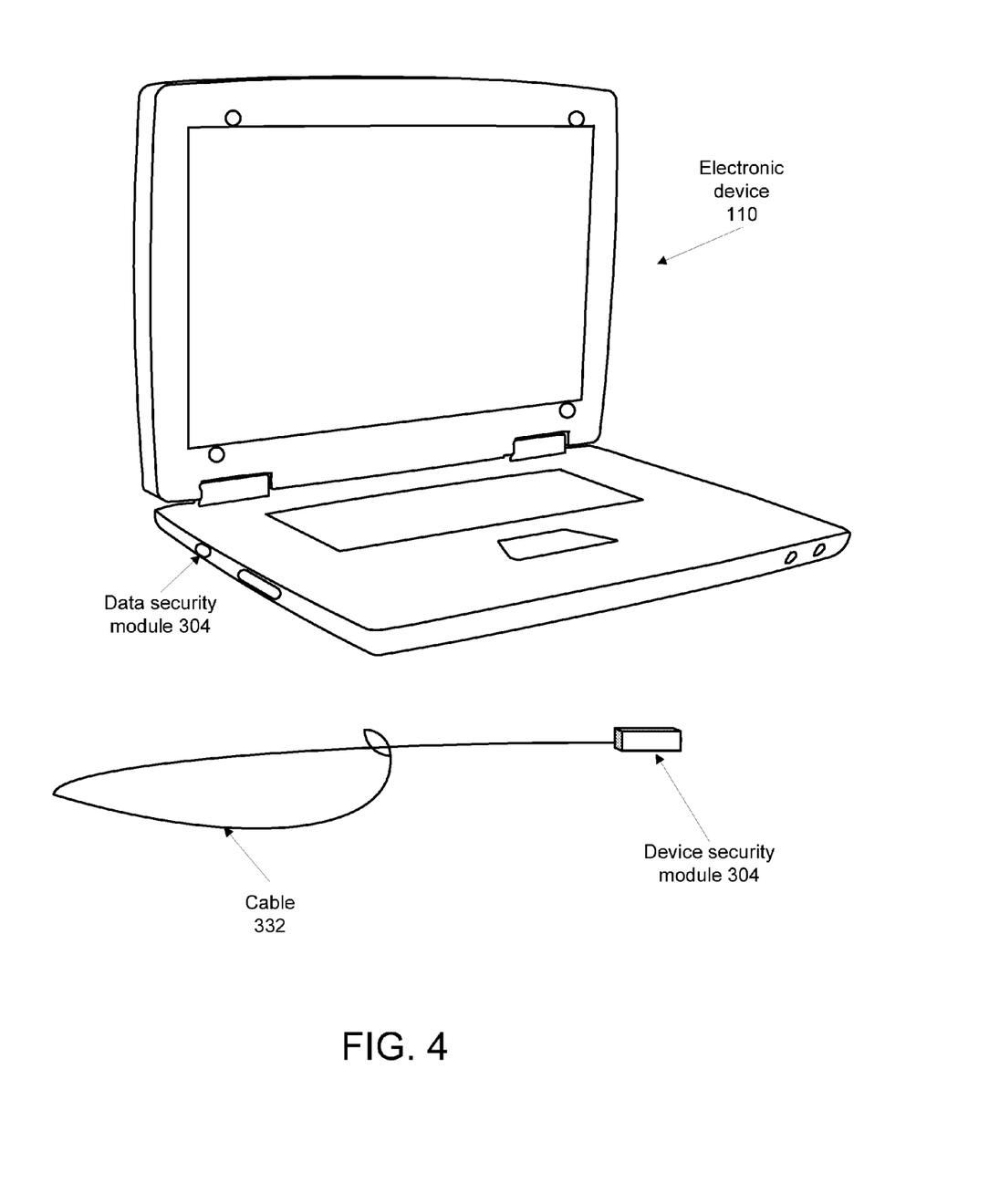
FIG. 4 is an illustration showing one embodiment of a system with the electronic device and lock components.

FIG. 4 is an illustration showing the electronic device 110 with a data security module 304 and a device security module 302. As discussed in connection with FIG. 3, the device security module 304 may be configured to connect to the data security module 304 and thereby couple to the electronic device 110 and secure it to a physical location. The device security module 304 may also share an authentication code with the data security module 304. The device security module 304 may share the authentication code by pushing the authentication code, pulling the authentication code, or some combination thereof. The data security module 304 may prevent the electronic device 110 from operating if the authentication code is either incorrect, or is not provided by the device security module 304. The device security module 304 may include a tamper module 206 that monitors the device security module 206 and/or the data security module 304 and determines whether the device security module 304 or the data security module 304 has been compromised. A destruction module 208 may destroy the device security module 304 and/or the data security module 304 if the tamper module 206 determines that one or both are compromised.

The destruction module 208 may destroy the device security module 304 by destroying an authentication code module that communicates the authentication code to the data security module 304. The destruction module 208 may do so by destroying a transmitter and/or receiver in the device security module 304.

The tamper module 206 may monitor a cable 332 of the device security module 304. The tamper module 206 may monitor the cable 332 to determine whether or not the cable 332 is severed. The tamper module 206 may determine that the device security module 304 has been compromised if the cable 332 is severed. The destruction module 208 may then destroy an enabling component in response. In certain embodiments, the destruction module 208 destroys enabling lock components.

Figure 5:
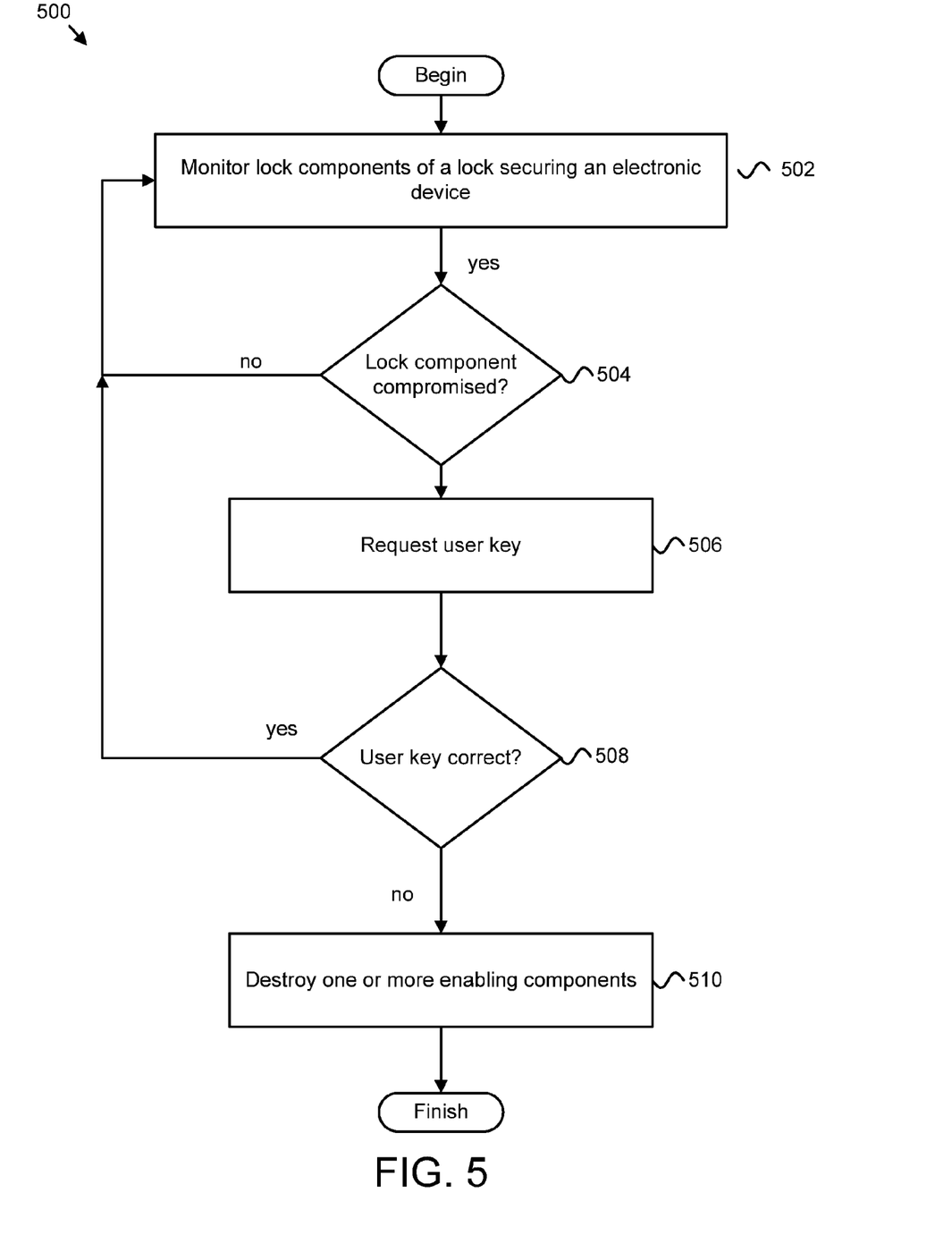
FIG. 5 is a flow chart diagram showing one embodiment of a method for securing an electronic device.

FIG. 5 shows one embodiment of a method 500 for securing an electronic device 110. In certain embodiments, the method 500 includes more or fewer steps than those shown. The steps shown in FIG. 5 may also be performed in an order other than that shown.

The method 500 begins with monitoring 502 lock components of a lock securing an electronic device 110. If a lock component 504 is not compromised, the monitoring continues. Determining whether or not a lock component is compromised may involve determining whether a lock component that is a cable 332 has been severed. Other lock components may also be monitored in order to determine whether or not the lock component has been compromised. Determining whether or not a lock component has been compromised may also involve requesting 506 a user key. A prompt may be displayed on the display of an electronic device. If the user key 508 is correct, the method 500 may conclude that the lock component is not compromised, and the monitoring 502 continues. If the user key is incorrect, the lock component may be deemed compromised. As noted above, the method 500 may involve providing the user with more than one attempt to enter the correct user key.

If a lock component is compromised, the method 500 includes destroying 510 one or more enabling components. As explained above, an enabling component is one that enables the electronic device 110 to operate. Certain components may be both lock components and enabling components. In one embodiment, the device security module 302 is both a lock component and an enabling component. In such embodiments, the method step 506 of destroying enabling components may comprise destroying the device security module 302. This may be done by destroying an authentication code module of the device security module 302. In certain embodiments, the electronic device 110 will not operate if the authentication code module is destroyed.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An apparatus comprising:
a tamper module that monitors one or more lock components of a lock securing an electronic device and that determines whether a lock component of the one or more lock components is compromised, the tamper module comprising an oxygen sensor sealed within a casing of a device security module containing at least one of nitrogen and carbon dioxide;
a destruction module that destroys an enabling component in response to the tamper module determining that the lock component is compromised, wherein an enabling component is a component that enables the electronic device to operate; and a key module that prompts a user for a user key and determines whether the user key is correct, wherein the tamper module determines that the lock component has been compromised if the user key is incorrect, the user key being used to encrypt and decrypt data on the electronic device.

2. The apparatus of claim 1, wherein one or more of the one or more lock components are enabling lock components, wherein an enabling lock component is a lock component that is also an enabling component that enables the electronic device to operate.

3. The apparatus of claim 2, wherein the destruction module destroys one or more enabling lock components in response to the tamper module determining that the lock component is compromised.

4. The apparatus of claim 2, wherein the enabling lock components comprise at least one of:

the device security module comprising a cable coupling to the electronic device and securing the electronic device to a feature, and sharing an authentication code with a data security module; and the data security module that prevents the electronic device from operating in response to one or both of:
the device security module being uncoupled from the electronic device; and
the authentication code being one of: incorrect; and not provided.

5. The apparatus of claim 4, wherein the destruction module destroys one of the device security module and the data security module.

6. The apparatus of claim 4, wherein the destruction module destroys the device security module by destroying an authentication code module that shares the authentication code with the data security module.

7. The apparatus of claim 4, wherein the tamper module determines that the cable is compromised in response to detecting that the cable is severed.

8. The apparatus of claim 4, wherein the tamper module determines that the device security module is compromised in response to detecting that the casing for the device security module is opened.

9. The apparatus of claim 1, wherein the destruction module destroys a plurality of enabling components in response to the tamper module determining that the lock component is compromised.

10. The apparatus of claim 1, wherein the tamper module invokes the key module in response to determining that a physical status of the lock component indicates that the lock component is compromised.

11. A system for securing an electronic device, the system comprising:

a device security module that couples to the electronic device and secures the electronic device to a physical location, and that shares an authentication code with a data security module, the device security module comprising a casing containing at least one of nitrogen and carbon dioxide;

the data security module that prevents the electronic device from operating in response to the authentication code being one of:
incorrect; and
not provided;

a tamper module that monitors the device security module and the data security module and that determines whether one of the device security module and the data security module is compromised, the tamper module comprising an oxygen sensor sealed within the casing of the device security module;

a key module that prompts a user for a user key and determines whether the user key is correct, wherein the tamper module determines that one of the device security module and the data security module has been compromised if the user key is incorrect, the user key being used to encrypt and decrypt data on the electronic device; and a destruction module that destroys one of the device security module and the data security module in response to the tamper module determining that one of the device security module and the data security module is compromised.

12. The system of claim 11, wherein the destruction module destroys the device security module by destroying an authentication code module that communicates the authentication code to the data security module.

13. The system of claim 11, wherein the device security module further comprises a cable.

14. The system of claim 13, wherein the tamper module determines that the cable is compromised in response to detecting that the cable is severed.

15. The system of claim 14, wherein the tamper module monitors a resistance of the cable and determines whether the cable is compromised using the resistance.

16. The system of claim 11, further comprising the electronic device, wherein the electronic device is one of a laptop computer, a cellular phone, a desktop computer, and a personal digital assistant (PDA).

17. A method for securing an electronic device, the method comprising:

monitoring one or more lock components of a lock securing an electronic device;

determining whether a lock component of the one or more lock components is compromised, wherein determining whether a lock component is compromised comprises sensing a presence of oxygen via an oxygen sensor within a sealed casing containing at least one of nitrogen and carbon dioxide; and destroying an enabling component in response to determining that the lock component is compromised, wherein an enabling component is a component that enables the electronic device to operate.

18. The method of claim 17, wherein a device security module that couples to the electronic device and secures the electronic device to a physical location is a lock component and an enabling component.

19. The method of claim 18, wherein destroying the enabling component comprises destroying the device security module.

20. The system of claim 11, wherein the tamper module determines that the device security module is compromised in response to sensing a presence of oxygen.

* * * * *